UNITED STATES PATENT OFFICE.

JOHN M. PETERSON, OF DAWSON, MINNESOTA.

PROCESS FOR FORMING SECONDARY-BATTERY PLATES.

1,375,317.  Specification of Letters Patent.  Patented Apr. 19, 1921.

No Drawing.  Application filed September 18, 1918. Serial No. 254,614.

*To all whom it may concern:*

Be it known that I, JOHN M. PETERSON, a citizen of the United States of America, residing at Dawson, in the county of Lac qui Parle and State of Minnesota, have invented new and useful Improvements in Processes for Forming Secondary-Battery Plates, of which the following is a specification.

Storage battery plates are of two types, the Faure type and the Planté type. The present invention is directed at the latter type, and its principal purpose is to provide a new and novel process for forming the plate so that an optimum may be obtained in the matter of the mechanical strength of the plate and the active material produced thereon.

Originally Planté plates were formed by assembling them in sets and subjecting heavy sheets of lead to a charging current when in a sulfuric acid solution. The cell thus formed was then discharged and subsequently recharged in the opposite direction, being again discharged and recharged in the original direction. By repeated chargings, and dischargings and reversals the surfaces of the plates were so thoroughly attacked by the oxygen as to corrode or oxidize its surface. Cells formed in this manner while very durable gave a very low efficiency in ampere hours per pound of lead due to the fact that the surfaces of the plate were plain and only allowed a small amount of active material to be corroded or oxidized from the surface. However the very great disadvantage of this process was that it required a very large amount of electric current and several months' time to produce and was therefore not a commercially practical one.

This tedious and expensive process of forming has been superseded by a pickling treatment of the heavy pure lead plates. The plates are first immersed in approximately a fifty per cent. solution of aqueous nitric acid for a prescribed length of time after which they are treated with ammonia and baked in an oven at high temperature, the pickling bath being, of course, to reduce the plates to a porous or spongy state. It matters not how carefully or with what skill the pickling operation is performed, it is next to impossible to completely remove every particle of the pickling acid or eradicate its deleterious effects and, where but a little remains, the plate is attacked by it with the result that the life of the plate is greatly shortened. Thus the pickling process of forming plates of which the above is but one of many used while shortening the operation, has the disadvantage of leaving some of this lead attacking acid in the plates with the result that in use the plates rapidly corrode with the result that they are soon eaten away and have to be replaced.

In the present invention it is purposed to spin, roll, cut, or cast the usual Planté plates or prepare them in any other manner whereby a maximum surface area may be obtained, these plates having sufficient strength to meet the various warping or bending stresses to which they would be subjected by reason of the thickness and solidity of the plates in carrying out the Planté idea of providing a sufficient body of lead to carry on a forming process of active material as the original active material is gradually disintegrated and lost from the plates. The plates are then given a coating of minium or red lead ($Pb_3O_4$) or oxid—literally painted—after which they are allowed to dry. When dry the plates are ready for forming and are thereupon immersed in an electrolyte—preferably an aqueous solution of sulfuric acid—and subjected to a charging current when the red lead or oxid on those plates constituting the anode is peroxidized forming lead peroxid ($PbO_2$). At the same time the red lead on the cathode is reduced—first to a lower oxid and then to spongy metallic lead.

The red lead thus acts as the initial active material and, as the cell of which the plates are parts is used, this initial active material falls away from the plates as is unavoidable in the operation of the cell, but slowly enough to permit the electrolyte to attack and oxidize the pure lead beneath, thus maintaining the Planté action of creating active material in progression with the operative wastage of such material, within the limits of the quantity of pure lead which forms the body of the plate. Not having been disintegrated by a pickling acid, the pure lead is found to be fresh when the electrolyte extends its action to the surfaces of the plates underlying the initial active material. The structure of the plates is not weakened by the application of the red lead in the manner above described—in fact it is strengthened as the red lead when transformed into the peroxid ($PbO_2$) becomes very hard and actually braces the otherwise easily bent soft lead.

My process thus differentiates radically from the well known process of making Faure plates, wherein a large body of active material is pasted or packed into a light strong grid, the grid necessarily being formed of material other than pure lead since pure lead would not afford sufficient strength if a sufficient amount of active material is stored in the grid to give the electrode a sufficient life upon the wearing away of active material in operative use. Thus the Faure plate provides an excess of active material, which is gradually used up, while my invention resides in providing only a proper amount of active material to procure the desired capacity, and in compensating for disintegration of this active material by the formation of fresh active material in synchronism with loss of its active material as in the Planté plates.

The improved process may be employed for the forming of positive plates solely or it may be varied—if made to include the negative plates—to the extent of initially coating or painting the negative plates with litharge or lead monoxid ($PbO$), this monoxid being reduced to spongy lead when the red lead on the positive plates is peroxidized.

This improved process for forming battery plates gives a relatively strong and long-lived plate as compared with the plate formed by the pickling process; gives a plate ready for immediate use inasmuch as the forming is accomplished while the plate is in service due to the application of initial active material; and gives a plate the cost of the forming of which is relatively low as the initial active material may be applied by a hand or machine operated brush and is less expensive than the pickling acid.

The invention having been described, what is claimed as new and useful is:

1. The process for forming Planté storage battery plates which consists in mechanically applying to a plate of metal capable of being formed into active material and having sufficient heaviness to maintain its shape and to supply a reserve of metal to be converted into active material, a coating embodying sufficient active material to initially provide for and maintain the desired electrical cell capacity.

2. The process for forming Planté storage battery plates which consists in mechanically applying to a pure lead plate of sufficient heaviness to maintain its shape and to supply a reserve of metal to be converted into active material, a coating embodying sufficient active material to initially provide for and maintain the desired electrical cell capacity.

3. The process for forming Planté storage battery plates which consists in mechanically applying to a plate of metal adapted to form active material and having sufficient heaviness to maintain its shape and to supply a reserve of metal to be converted into active material, a coating embodying sufficient active material to initially provide for and maintain the desired electrical cell capacity of the plate, and in then subjecting the plate to a forming electro-chemical action.

4. The process for forming Planté storage battery plates which consists in mechanically applying to a pure lead plate of sufficient heaviness to maintain its shape and to supply a reserve of metal to be converted into active material, a coating of minium or red lead and then subjecting said plate to electro-chemical action to reduce said minium or red lead to lead peroxid.

In testimony whereof I affix my signature.

JOHN M. PETERSON.